__United States Patent__ [19]

Hall

[11] 4,156,767

[45] May 29, 1979

[54] ETHYLENE, C$_{3-16}$ MONOOLEFIN POLYMER CONTAINING 0.02%–0.6% BY WEIGHT VINYL NORBORNENE BOUND IN THE POLYMER HAVING IMPROVED COLD FLOW

[75] Inventor: James R. Hall, Baton Rouge, La.

[73] Assignee: Copolymer Rubber & Chemical Corporation, Baton Rouge, La.

[21] Appl. No.: 797,298

[22] Filed: May 16, 1977

[51] Int. Cl.$^2$ .................. C08F 4/42; C08F 236/00; C08F 36/00; C08K 5/01

[52] U.S. Cl. ...................... 526/282; 526/143; 526/281

[58] Field of Search ............... 526/281, 282

[56] References Cited

U.S. PATENT DOCUMENTS

| | | | |
|---|---|---|---|
| 3,287,327 | 11/1966 | Zutty | 526/281 |
| 3,299,017 | 1/1967 | Zelinksi et al. | 526/281 |
| 3,467,637 | 9/1969 | Prucnal | 526/281 |
| 3,489,733 | 1/1970 | Natta et al. | 526/282 |
| 3,674,754 | 7/1972 | Cameli et al. | 526/282 |
| 3,681,302 | 8/1972 | Sweeney | 526/281 |
| 3,819,591 | 6/1974 | Campbell et al. | 526/281 |
| 3,879,343 | 4/1975 | DeBrunner et al. | 526/281 |
| 3,894,999 | 7/1975 | Boozer et al. | 526/282 |
| 3,926,901 | 12/1975 | Boozer et al. | 526/282 |
| 4,025,497 | 3/1977 | Natta et al. | 526/282 |

*Primary Examiner*—Herbert J. Lilling
*Attorney, Agent, or Firm*—McDougall, Hersh & Scott

[57] ABSTRACT

EP polymer of low molecular weight containing 0.02% to 0.6% by weight vinyl norbornene or norbornadiene whereby the cold flow of the EP polymer is improved with resultant improvement in recoverability and handling without noticeable modification in molecular weight distribution or shear stability and without interfering with the use thereof as an oil additive, and without so much as to decrease oil solubility rate.

5 Claims, No Drawings

ETHYLENE, $C_{3-16}$ MONOOLEFIN POLYMER CONTAINING 0.02%–0.6% BY WEIGHT VINYL NORBORNENE BOUND IN THE POLYMER HAVING IMPROVED COLD FLOW

This invention relates to ethylene-propylene polymers (EP) and to a method for producing same.

EP polymers have heretofore been produced but, for the most part, such EP polymers present a number of problems in manufacture and use, especially when such polymers are of low molecular weight. One such problem results from the excessive cold flow of such polymers, which makes it difficult to bale the polymer for packaging and for shipment to distant stations, and which introduces problems having to do with the recoverability of the polymer.

EP polymers which have heretofore been produced for use as oil additives have low Mooney values and are of low molecular weight and therefore quite sticky. This makes them difficult to handle and difficult to package, as by baling, and they are difficult to dry and recover.

An important use that is made of EP polymers of the type described is for the improvement of the viscosity index of lubricating oils.

It is an object of this invention to produce and to provide a method for producing EP or EPDM polymers of low molecular weight characterized by improved cold flow, with corresponding improvement in handling, packaging and recoverability without deterioration of others of the desirable properties, such as molecular weight distribution, thickening power, shear stability, oil solubility, and without formation of an excessive amount of gel.

It has been found that the desired results can be achieved, in accordance with the practice of this invention, by including a low level of norbornadiene and preferably vinyl norbornene with the ethylene-propylene monomers that are being copolymerized. By a low level is meant an amount less than 0.6% by weight of the total monomers polymerized to form the EP. The desired results are observed in the formed polymer when the norbornadiene and preferably the norbornene monomer or monomers are present in an amount as little as 0.02% by weight of total monomer.

The ethylene and propylene monomers are combined in the interpolymer in the mole ratio of 10–95 moles ethylene to 90–5 moles propylene, with the polymerization being carried out in solvent solution in the presence of a Ziegler type catalyst.

While it is preferred to make use of propylene as the monomer that is copolymerized with ethylene and the norbornadiene or vinyl norbornene, other monoolefins having from 3 to 16 carbon atoms can be substituted in whole or in part for the propylene.

The polymerization solvent may be any suitable inert or saturated hydrocarbon which is liquid and relatively nonviscous under the reaction conditions, including the prior art solvents for the solution polymerization of monoolefins in the presence of a Ziegler catalyst. Examples of satisfactory hydrocarbon solvents include open chain saturated hydrocarbons containing 5 to 8 carbon atoms, of which hexane is usually preferred, aromatic hydrocarbons and especially those containing a single benzene nucleus such as benzene or toluene; and saturated cyclic hydrocarbons which have boiling ranges approximating those for the open chain and aromatic hydrocarbons discussed above, and especially saturated cyclic hydrocarbons containing 5 or 6 carbon atoms in the ring. The solvent may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfere with the Ziegler catalyst.

In general, any suitable prior art Ziegler-type catalyst may be used which is known to produce a satisfactory elastomer. Ziegler catalysts are disclosed in a large number of issued patents, such as U.S. Pat. Nos. 2,933,980; 3,093,620; 3,093,621; 3,211,709 and 3,113,115. Examples of Ziegler catalysts include metal organic coordination catalysts prepared by contacting a compound of a metal of Groups IV, Va, VIa and VIIa of the Mendelejeff periodic chart of the elements, as typified by titanium, vanadium and chromium halides, with an organo-metallic compound of a metal of Groups I, II or III of the Mendelejeff periodic chart which contains at least one carbon-metal bond, as typified by trialkyl aluminum and alkyl aluminum halides wherein the alkyl groups contain 1 to 20 and preferably 1 to 4 carbon atoms.

The preferred Ziegler catalyst for many polymerizations is prepared from a vanadium compound and an alkyl aluminum halide. Examples of suitable vanadium compounds include vanadium trichloride, vanadium tetrachloride, vanadium oxytrichloride, vanadium acetylacetonate, etc. Activators which are especially preferred include alkyl aluminum chlorides of the general formula $R_1AlCl_2$ and $R_2AlCl$, and the corresponding sesquichlorides of the general formula $R_3Al_2Cl_3$, wherein R is a methyl, ethyl, propyl, butyl or isobutyl radical. A catalyst prepared from methyl or ethyl aluminum sesquichloride and vanadium oxytrichloride is especially preferred, and when using the catalyst, the optimum ratio of the catalyst components is usually 1 mole of vanadium oxytrichloride for each 8 to 20 moles of the alkyl aluminum sesquichloride.

EXAMPLE 1

The reaction vessel was a one-gallon Sutherland reactor equipped with a high speed, heavy-duty, air driven motor; cooling coils; a thermometer; a temperature regulator; a pressure regulator; an injection port; and other openings where monomers, catalyst, and solvent were fed to the reactor. A tube dipping to the bottom of the reactor was present for the continuous removal of the cement produced. A vapor phase vent was provided to bleed off 10% of the gaseous monomer feed to prevent inert gas buildup.

The clean reactor was assembled, rinsed with dry hexane and purged overnight with dry nitrogen. Hot water was run through the coils and the temperature in the reactor was about 70° C. After this, propylene was flushed through the reactor for about 15 minutes; then the temperature was lowered to ambient and two liters of Esso chemical grade hexane, dried over 4A molecular sieves and stored over sodium, was added to the reactor. As the temperature reached 45° C., propylene was fed to the reactor through a 4A molecular sieve column until 5 ft. 10 5/16 in. Hg pressure was reached. The pressure was then brought up to 30 psig with ethylene fed through a 4A molecular sieve column and 60 $\mu$ liters of pyridine along with 2.6 cc of 1.5 M ethyl aluminum sesquichloride were added.

The monomers were shut off and the catalysts, 0.20 molar ethyl aluminum sesquichloride and 0.006 molar vanadium oxytrichloride at a 40 to 1 aluminum to vanadium ratio, and 0.042 molar butyl perchlorocrotonate (BPCC) at a 7.0 to 1 BPCC vanadium ratio, were fed into the reactor at a constant rate until a drop in pressure in the reactor was noted. At this time, monomers were fed into the reactor through suitable calibrated rotometers at a rate of 3271 cc per minute of which 1703 cc were ethylene and 1548 cc were propylene and 20 cc were vinyl norbornene in a hexane solution at a concentration of 0.04 g VN/100 ml solution. The polymerization was controlled by the catalyst pumps which added catalyst on demand as the pressure increased, thus maintaining 30 psig pressure throughout the run. When the solution became approximately 8% polymer, solvent containing 16 cc per cc ethylene was fed at the rate of 52.8 cc per minute into the reactor and the polymer cement taken off which produced about 220 g of polymer per hour.

At this time, the ethylene, propylene and vinyl norbornene solution containing 0.04 g VN/100 ml were adjusted to 891 cc per minute, 2936 cc per minute and 80 cc per minute respectively, to compensate for the unreacted monomers removed with the cement. An additional 897 cc ethylene were being added at the same time with the make-up solvent.

The solvent cement, as removed from the reactor, was fed into a Waring blender containing water where it was intimately mixed with the water. The cement was then washed two times with equal volumes of water and Irganox 1010 solution was added as a stabilizer. The washed and stabilized cement was fed with nitrogen pressure into a tee joint at the bottom of a 4 liter container full of hot circulating water. The other end of the tee is connected to a steam line and steam was admitted at a rate to superheat the rubber cement. The solvent and unreacted monomers were substantially entirely removed by this procedure. The rubber crumb was collected on a screen, washed and chopped in the blender. The rubber crumb was dried in an oven at 90° C. to remove any remaining solvent and water, yielding a rubbery polymer containing 57 mole percent ethylene by infrared analysis, using the 720 cm$^{-1}$ absorbent for ethylene and the 968 cm$^{-1}$ absorbent for propylene, and had a reduced specific viscosity in Decalin at 135° C. of 1.9.

The formed polymer had a Mooney viscosity of 30 ML$_{1+8}$ at 250° F. and negligible amount of gel in benzene.

The formed polymer was determined by bromination to have an unsaturation level of about 0.25 C=C groups per 1000 carbon atoms. The improvement in polymer handling and reduction in cold flow is believed to stem, at least in part, from branching that takes place between the ethylene-propylene monomers with the vinyl norbornene or norbornadiene, as by reaction of the double bond in the vinyl group of the vinyl norbornene into the polymer in addition to the ring double bond. The amount of vinyl norbornene or norbornadiene is not sufficient to cause an amount of branching that would lead to gel formation. Too much branching interferes with the use of the polymer as an oil additive. When measured from the standpoint of branching in the formed polymer, it is desirable to restrict the incorporation of the vinyl norbornene or norbornadiene in an amount to provide 0.02 to 0.6 percent by weight in the polymer. An amount of unsaturation in the polymer that exceeds 0.6 percent vinyl norbornene by weight in the polymer interferes with the shear stability and oil solubility of the polymer.

Thus improvements in handling and cold flow of low molecular weight EP polymers is achieved without visible gel in cements produced of the polymer, and without noticeable effect on the molecular weight distribution as determined by gel permeation chromatography, without significant differences in thickening power and shear stability as determined by tests in oil solution of polymers prepared in accordance with the practice of this invention, by reference to Example 1 compared to a control without vinyl norbornene.

The vinyl norbornene may be replaced in whole or in part by norbornadiene in Example 1 and the amounts incorporated therein may be varied from a ratio of 0.02% up to 0.6% by weight of the monomer contained in the formed polymer. The propylene in Example 1 may be substituted in whole or in part with other monoolefins such as butylene, pentylene, hexylene and the like, but best results are secured when the polymer is formed of ethylene-propylene with low levels of vinyl norbornene or norbornadiene.

The resulting product can be used as an additive to oil as a viscosity index improver in the manner heretofore employed with conventional EP polymers without introducing any undesirable characteristics in the use of the additive or the oil composition containing the same.

It will be understood that changes may be made in the details of formulation and operation without departing from the spirit of the invention, especially as defined in the following claims.

I claim:

1. An oil soluble, substantially gel-free ethylene, $C_{3-16}$ monoolefin polymer of low molecular weight having a mole ratio of 10–95 moles of ethylene to 90–5 moles of monoolefin containing 3 to 16 carbon atoms and 0.02% to 0.6% by weight vinyl norbornene bound in the polymer which provides an amount of unsaturation that does not interfere with shear stability or oil solubility and does not cause branching that would lead to gel formation, in which the polymer is prepared by polymerization of the monomers in solvent solution in the presence of a Ziegler type catalyst.

2. A polymer as claimed in claim 1 in which the monoolefin is propylene.

3. A polymer as claimed in claim 1 in which the polymer contains 0.02 to 0.6 percent by weight vinyl norbornene.

4. A polymer as claimed in claim 3 in which the percent vinyl norbornene by weight is less than 0.25 in the polymer.

5. A polymer as claimed in claim 2 in which the cold flow, with resultant improvement in recoverability and handling, is improved by comparison with polymers of the same composition except that the vinyl norbornene is not present, without noticeable interference with molecular weight distribution, shear stability, and without increase in gel formation.

* * * * *